(12) United States Patent
Marcus

(10) Patent No.: US 10,229,106 B2
(45) Date of Patent: Mar. 12, 2019

(54) INITIALIZING A WORKSPACE FOR BUILDING A NATURAL LANGUAGE UNDERSTANDING SYSTEM

(71) Applicant: Nuance Communications, Inc., Burlington, MA (US)

(72) Inventor: Jeffrey N. Marcus, Newton, MA (US)

(73) Assignee: Nuance Communications, Inc., Burlington, MA (US)

( * ) Notice: Subject to any disclaimer, the term of this patent is extended or adjusted under 35 U.S.C. 154(b) by 94 days.

(21) Appl. No.: 13/952,175

(22) Filed: Jul. 26, 2013

(65) Prior Publication Data

US 2015/0032441 A1    Jan. 29, 2015

(51) Int. Cl.
*G06F 17/27* (2006.01)

(52) U.S. Cl.
CPC ................... *G06F 17/271* (2013.01)

(58) Field of Classification Search
None
See application file for complete search history.

(56) References Cited

U.S. PATENT DOCUMENTS

| | | | |
|---|---|---|---|
| 6,631,346 B1 * | 10/2003 | Karaorman et al. | 704/9 |
| 7,610,191 B2 * | 10/2009 | Gao et al. | 704/9 |
| 7,693,705 B1 * | 4/2010 | Jamieson | 704/9 |
| 7,840,400 B2 * | 11/2010 | Lavi | G06F 17/277 704/9 |
| 8,265,925 B2 * | 9/2012 | Aarskog | G06F 17/271 704/1 |
| 2002/0077823 A1 * | 6/2002 | Fox | G06F 8/34 704/260 |
| 2003/0212544 A1 * | 11/2003 | Acero | G06F 17/2785 704/9 |
| 2005/0027664 A1 * | 2/2005 | Johnson | G06F 17/2827 706/12 |
| 2006/0129591 A1 * | 6/2006 | Ramsey et al. | 707/102 |
| 2006/0277031 A1 * | 12/2006 | Ramsey | G06F 17/2765 704/9 |
| 2006/0287846 A1 * | 12/2006 | Ollason | G10L 15/19 704/4 |
| 2007/0112556 A1 * | 5/2007 | Lavi | G06F 17/277 704/9 |

(Continued)

*Primary Examiner* — Michael N Opsasnick
(74) *Attorney, Agent, or Firm* — Hamilton, Brook, Smith & Reynolds, P.C.

(57) ABSTRACT

Designing a natural language understanding (NLU) model for an application from scratch can be difficult for non-experts. A system can simplify the design process by providing an interface allowing a designer to input example usage sentences and build an NLU model based on presented matches to those example sentences. In one embodiment, a method for initializing a workspace for building an NLU system includes parsing a sample sentence to select at least one candidate stub grammar from among multiple candidate stub grammars. The method can include presenting, to a user, respective representations of the candidate stub grammars selected by the parsing of the sample sentence. The method can include enabling the user to choose one of the respective representations of the candidate stub grammars. The method can include adding to the workspace a stub grammar corresponding to the representation of the candidate stub grammar chosen by the user.

19 Claims, 6 Drawing Sheets

(56) References Cited

U.S. PATENT DOCUMENTS

| | | | |
|---|---|---|---|
| 2008/0010069 A1* | 1/2008 | Katariya | G06F 9/4443 704/257 |
| 2008/0154581 A1* | 6/2008 | Lavi | G06F 17/277 704/9 |
| 2009/0106208 A1* | 4/2009 | Matellanes | G06F 17/30734 |
| 2009/0192786 A1* | 7/2009 | Assadollahi | 704/9 |
| 2009/0259613 A1* | 10/2009 | Liu | G10L 15/22 706/47 |
| 2009/0276380 A1* | 11/2009 | Acero et al. | 706/12 |
| 2010/0145710 A1* | 6/2010 | Tremblay | G10L 15/1815 704/275 |
| 2010/0228693 A1* | 9/2010 | Dawson | G06F 17/2705 706/12 |
| 2010/0318348 A1* | 12/2010 | Chelba et al. | 704/9 |
| 2011/0082688 A1* | 4/2011 | Kim et al. | 704/9 |
| 2011/0238409 A1* | 9/2011 | Larcheveque | G06F 17/2785 704/9 |
| 2011/0251984 A1* | 10/2011 | Nie | G06F 17/30731 706/18 |
| 2012/0209613 A1* | 8/2012 | Agapi et al. | 704/270.1 |
| 2012/0233207 A1* | 9/2012 | Mohajer | G06F 17/30663 707/769 |
| 2013/0035932 A1* | 2/2013 | Bangalore et al. | 704/9 |
| 2013/0110505 A1* | 5/2013 | Gruber et al. | 704/9 |
| 2014/0207439 A1* | 7/2014 | Venkatapathy | G06F 17/2836 704/4 |
| 2014/0244254 A1* | 8/2014 | Ju | G10L 15/22 704/243 |
| 2014/0379326 A1* | 12/2014 | Sarikaya | G10L 15/18 704/9 |

\* cited by examiner

INITIALIZING A WORKSPACE FOR BUILDING A NATURAL LANGUAGE UNDERSTANDING SYSTEM

RELATED APPLICATION

This Application is related to "Method and Apparatus for Selecting Among Competing Models in a Tool for Building Natural Language Understanding Models" by Jeffrey N. Marcus, Ser. No. 13/952,213 filed on the same day as this Application to a common assignee. The foregoing application is hereby incorporated by reference in its entirety.

BACKGROUND

When a designer wants to build a Natural Language Understanding (NLU) model for a new application (e.g., an airline reservation system), the designer starts a new project and configures that project with an ontology. The ontology is an an organizing structure of concepts that the NLU application handles. For example, a project may handle fields such as DATE, LOCATION, DATERANGE, or AMOUNT, etc. Typically, NLU models for many of these concepts are built-in within a designer portal and other more specialized NLU models (such as the airplane seating types for a particular airline) may need to be created by the designer.

SUMMARY

Natural Language Understanding (NLU) applications often include many concepts. A non-expert may experience difficulty identifying built-ins (pre-made fields) to use in an NLU project. Online documentation can assist the designer; however, a more intuitive user interface would allow the designer to type in examples of expected sentences for the NLU application. For those examples, the designer can use an embodiment of the present invention to pre-populate the project with the matching built-ins. Additionally, the embodiment of the present invention identifies sentences that do not match any concepts well for which the designer needs to create the concepts. Since NLU application designers often start off by writing "sample dialogs" consisting of system-generated prompts followed by designer responses, discover-by-example is a natural way to configure a project.

Discover-content-by-example includes a set of natural language (NL) models for interpreting concepts such as DATE, DATERANGE, AMOUNT, etc. The designer types in expected sentences from users using the NLU application to say within the dialog, perhaps with some context such as the general business type (travel, banking, etc.). The phrase is processed by all NL models included in a portal, and then each model returns a semantic confidence score, which can be arbitrarily defined. Based on a designer-defined threshold, zero or more models are identified as matching the sentence. If exactly one model is identified, it can be loaded into the project ontology. If more than one model is identified, the designer can choose one or more models from among them. If no models are identified, the system can display a message that no good match has been found, and the designer can create a new model.

Further, the system can be extended to discover contents by sample system prompts (e.g., the prompts the system plays to the user to elicit his responses) instead of sample user responses. This may be even more powerful since the designer has control over prompts but has to guess at user responses. A database may be built from previously created or previously released deployments consisting of prompt text and associated responses by the user, with each user response precompiled into the concepts used to form it. When the designer types in a sample prompt from the corresponding application, the sample prompt is run against the database, and a "prompt match score" is assigned for each prompt in the database using some measure of semantic similarity. If there is a high match score, the set of concepts that are associated with that prompt are loaded into the NL Portal project.

For example, a sample prompt may be "When would you like to travel?". The database may have a prompt of "When are you travelling?" associated with the concepts DATE and TIME. This sentence is given a large semantic match score with the sentence in the database. A semantic match score is a score indicating the relatedness of two sentences. A high score indicates that two sentences are highly related and a low score indicates that the two sentences are not highly related. DATE and TIME is automatically loaded into the project ontology because of the semantic match score of the two sentences and the association with the database's prompt with the DATE and TIME concepts.

In one embodiment, a method for initializing a workspace for building a Natural Language Understanding (NLU) system includes parsing a sample sentence to select at least one candidate stub grammar from among multiple candidate stub grammars. The term "stub grammar" is used herein, and in any continuing applications, to refer to a subset of a grammar, where a "grammar" is understood in the art to mean a model that correlates an input of a user to a response to the user.

The method can further include presenting respective representations of the candidate stub grammars selected by the parsing of the sample sentence to a user. The method can additionally include enabling the user to choose one of the respective representation of the candidate stub grammars. The method can further include adding to the workspace a stub grammar corresponding to the representation of the candidate stub grammar chosen by the user.

The respective representations can be names or identifiers of the candidate stub grammar or contents of the candidate stub grammar itself.

If the prasing of the sample sentence selects one candidate stub grammar from among multiple candidate stub grammars, the method can skip presenting the a respective representation of the one candidate stub grammar to the user and also skip enabling the user to choose the one candidate stub grammar. The method can include directly adding the one candidate stub grammar to the workplace (e.g., without user input since there is only grammar to choose from).

In another embodiment, the method can include presenting each respective representation of the candidate stub grammars to the user by visually presenting each of the respective representations of the candidate stub grammars relative to a corresponding part of the sample sentence.

In yet a further embodiment, parsing the sample sentence includes parsing the sample sentence to generate a set of annotations including mentions. The annotations can further include mentions and intents. An intent refers to an end user's basic goal for a machine interaction. A mention refers to a piece of information the natural language application uses to complete the action indicated by the intent.

In another embodiment, the presented respective representations can have a semantic match to the parsed sample sentence above a particular threshold.

In another embodiment, a system for initializing a workspace for building a Natural Language Understanding (NLU) system can include a parsing module configured to parse a sample sentence to select at least one candidate stub grammar from among multiple candidate stub grammars. The system can further include a presentation module configured to present respective representations of the candidate stub grammars selected by the parsing of the sample sentence to the user. The system can further include a user interface module configured to enable the user to choose one of the respective representations of the candidate stub grammars. The system can additionally include a workspace building module configured to add a chosen grammar, chosen by the user from among the respective presented representations, to the workspace.

In another embodiment, a non-transitory computer-readable medium can be configured to store instructions for initializing a workspace for building a Natural Language Understanding (NLU) system. The instructions, when loaded and executed by a processor, can cause the processor to parse a sample sentence to select at least one candidate stub grammar from among multiple candidate stub grammars. The instructions can further cause the processor to present respective representations of the at least one candidate stub grammar selected by the parsing of the sample sentence to a user. The instructions can additionally cause the processor to enable the user to choose one of the respective representation of the candidate stub grammars. The instructions can further cause the processor to add to the workspace a stub grammar corresponding to the representation of the candidate stub grammar chosen by the user.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
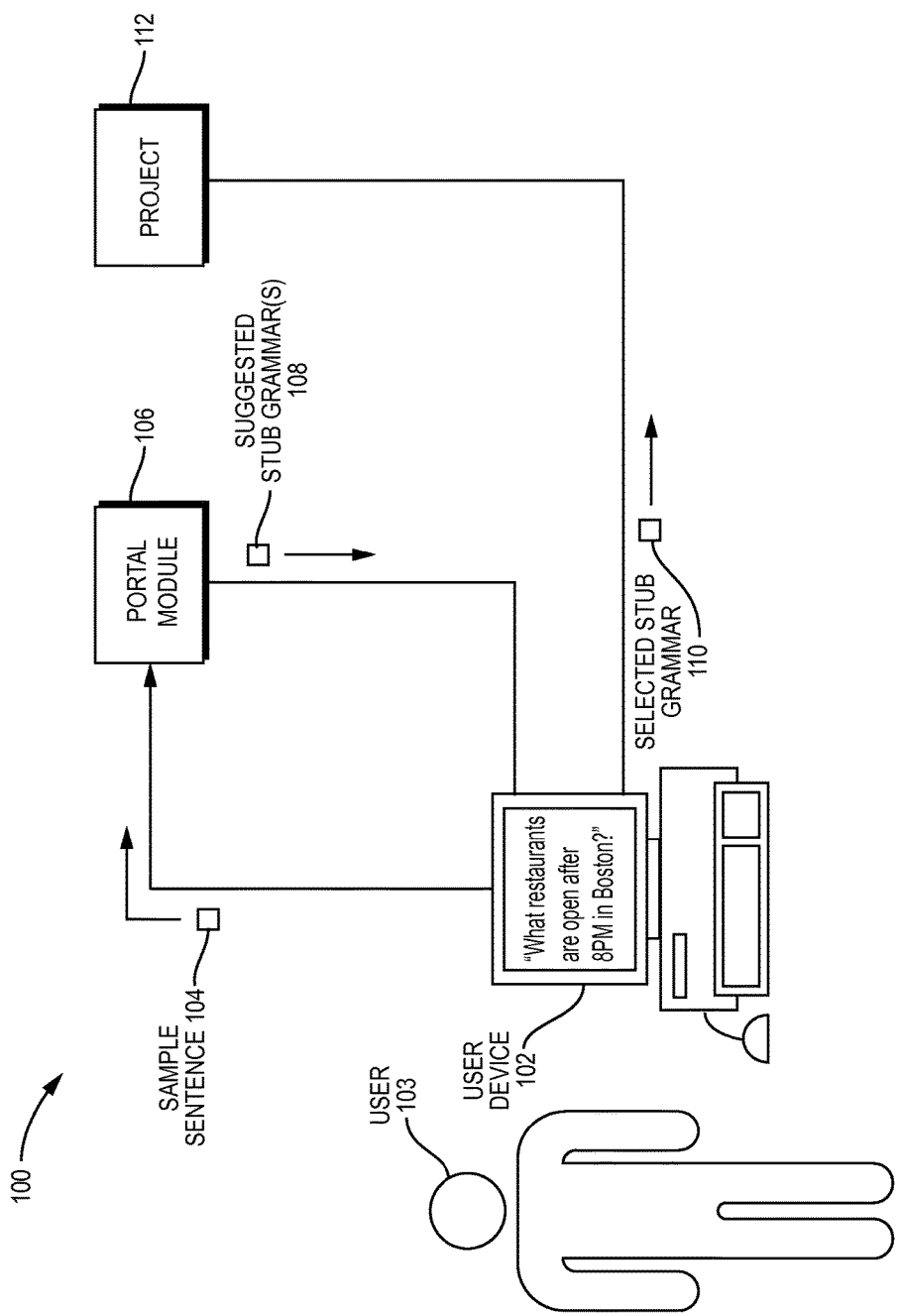
FIG. 1 is a block diagram illustrating an example embodiment of the present invention.

FIG. 1 is a block diagram 100 illustrating an example embodiment of the present invention. A user 103 employs a user device 102 to input at least one sample sentence 104. For example, in FIG. 1, the user 103 inputs the sentence "What restaurants are open after 8PM in Boston?" to the user device 102. The user device 102 forwards the sample sentence 104 to a portal module 106. The portal module 106 parses the sample sentence 104 and compares each part of the parsed sample sentence to a description of the candidate stub grammars (not shown) of a library (not shown). Stub grammars are a subset of a grammar, where a "grammar" is understood in the art to mean a model that correlates an input of a user to a response to the user. When a candidate stub grammar has a high semantic match to the sample sentence, in one embodiment, the portal module 106 forwards the stub grammar with the high suggested match to the user device 102. The portal module 106 can also forward a group of suggested stub grammars 108 with high semantic matches to the sample sentence to the user device 102. The user device 102 presents the suggested stub grammars to the user 103 and allows the user 103 to select one of the suggested stub grammars 108. The user device forwards the selected stub grammar 110 to a project 112 for incorporation.

The project 112 can be a workplace or model that is to be used for building a natural language understanding (NLU) system. If the portal module 106 finds only one stub grammar with a high semantic match to the sample sentence, the portal module 106 can forward the stub grammar 108 directly to the project 112 without asking the user 103 for input because the user 103 has no choice of which stub grammar to select. However, the portal module 106 can be configured to present the user with the choice of selecting the one stub grammar 108 or selecting no grammar at all.

Figure 2:
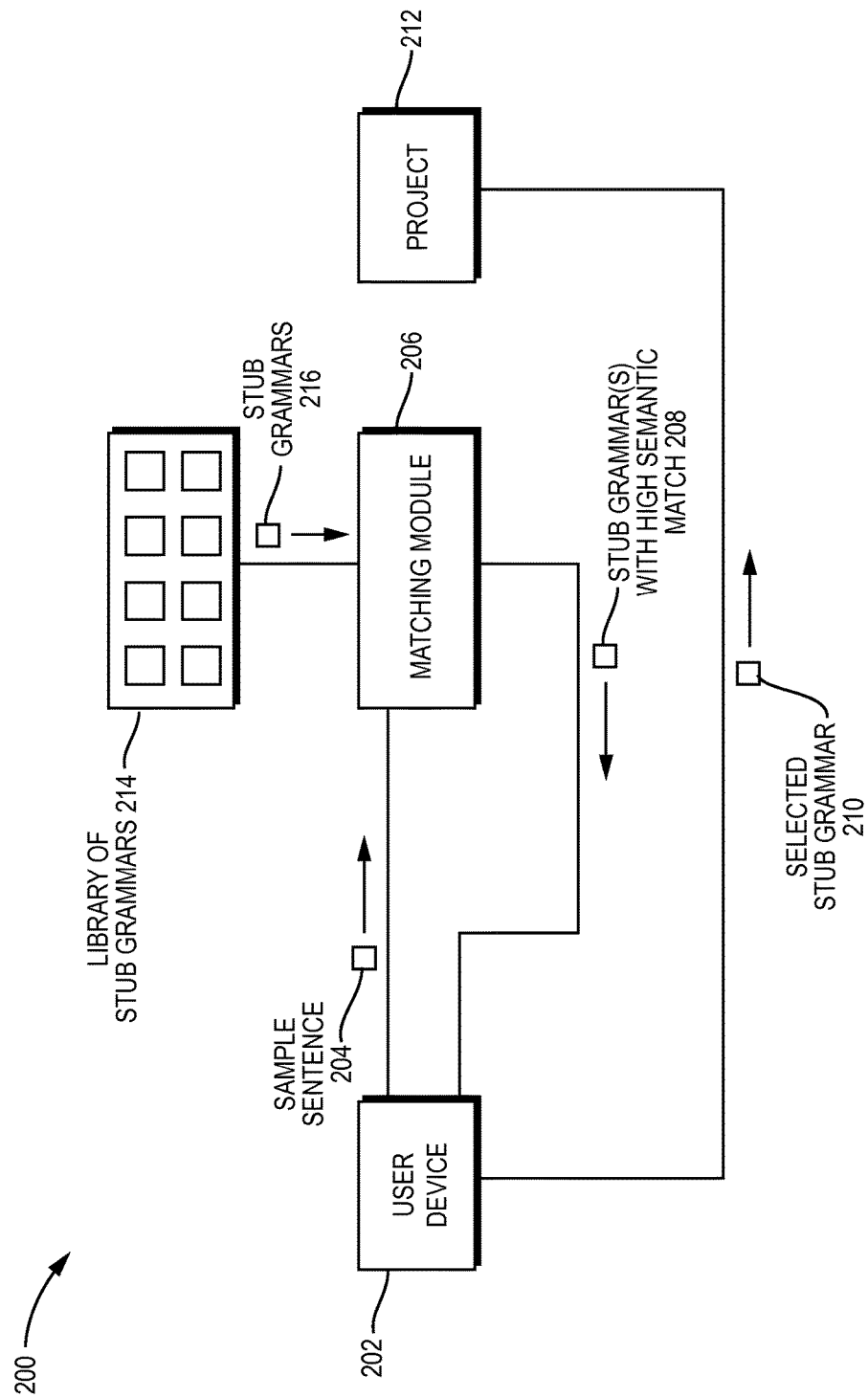
FIG. 2 is a block diagram illustrating an example embodiment of the present invention.

FIG. 2 is a block diagram 200 illustrating an example embodiment of the present invention. A user device 202 forwards a sample sentence 204 to a matching module 206. The user device 202, in one embodiment, can be a console, tablet, personal computer, or other device. The matching module 206, in one embodiment, can be a part of the portal module 106 of FIG. 1, the matching module 206 of FIG. 2 configured to receive candidate stub grammars 216 of a library of stub grammars 214. The matching module 206 parses the sample sentence 204 and determines which stub grammars of the forwarded stub candidate grammars 216 have a high semantic match to the sample sentence 204. The matching model 206 forwards candidate stub grammar(s) 208 with a high semantic match to the user device 202 for presentation to the user. The presentation to the user can be presenting a representation of the candidate grammar, such as a name of the candidate grammar, to the user. The user of the user device 202 then selects a presented candidate stub grammar (e.g., selected stub grammar 210). The matching module then installs the selected stub grammar 210 in the project 212.

Figure 3:
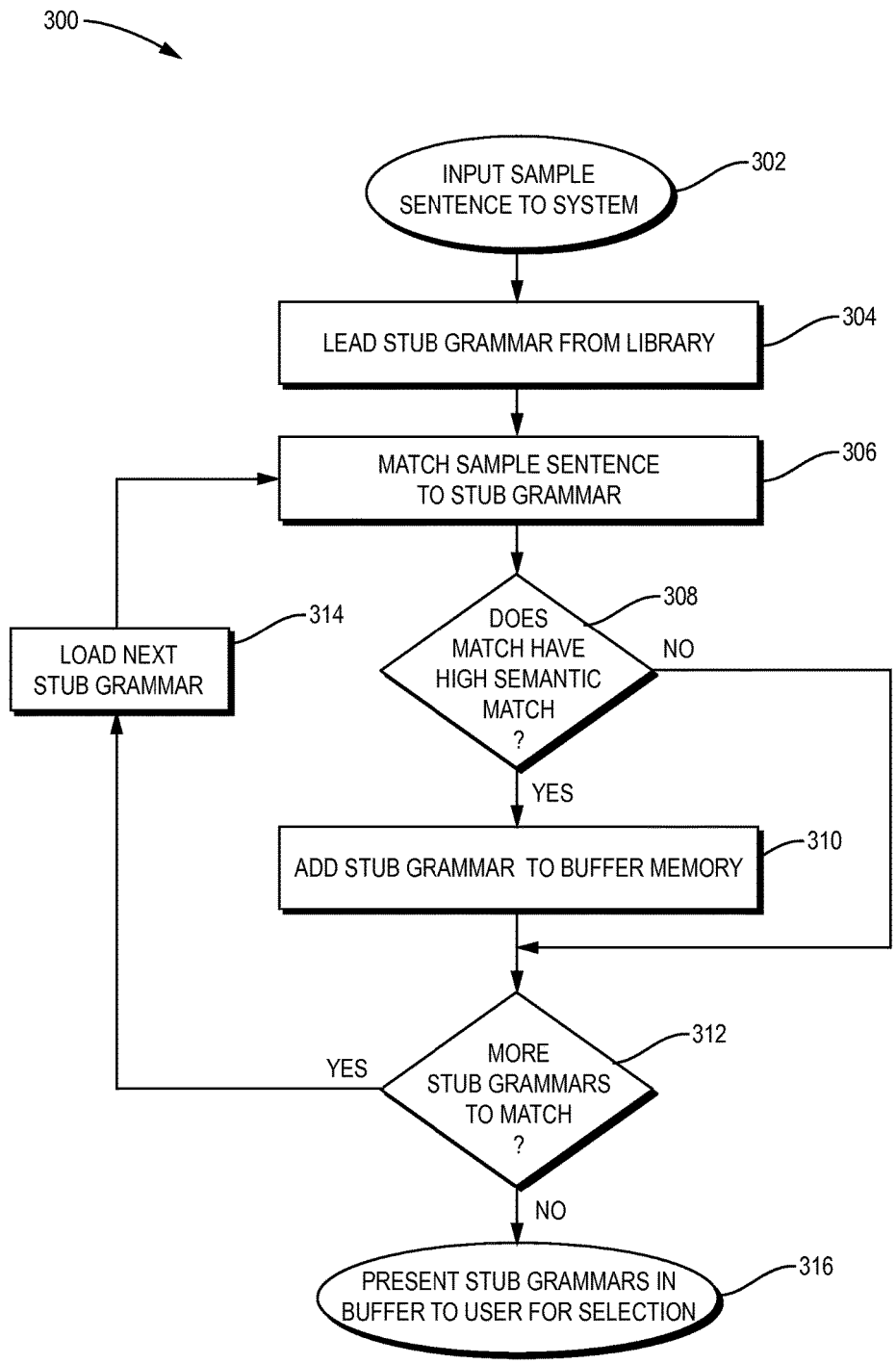
FIG. 3 is a flow diagram illustrating an example process employed by the present invention.

FIG. 3 is a flow diagram 300 illustrating an example process employed by the present invention. The system first inputs a sample sentence to the system, for example, from the user (302). Then, the system loads a candidate stub grammar from a library (304). The system then matches a sample sentence to the candidate stub grammar (306). The system then determines whether the matched candidate stub grammar has a high semantic match to the sample sentence (308). If the sentence does have a high semantic match to the candidate stub grammar, the system adds the stub grammar to a buffer memory (310). Then, the system determines whether more candidate stub grammars are in the library to be matched (312). If so, the system loads the next candidate stub grammar (314). Then, the system matches the sample sentence to the loaded candidate stub grammar (306).

On the other hand, if the system does not determine that the candidate stub grammar has a high semantic match to the sample sentence, the system determines whether there are more candidate stub grammars to be matched (312). If so, the system loads the next candidate stub grammar (314), and if not, the system presents a representation of the candidate stub grammars in the buffer to the user for selection (316). The representation of the candidate stub grammars can be a name of the grammar, a description of the grammar, representation of fields of the stub grammar, or other representation of the grammar.

Figure 4:
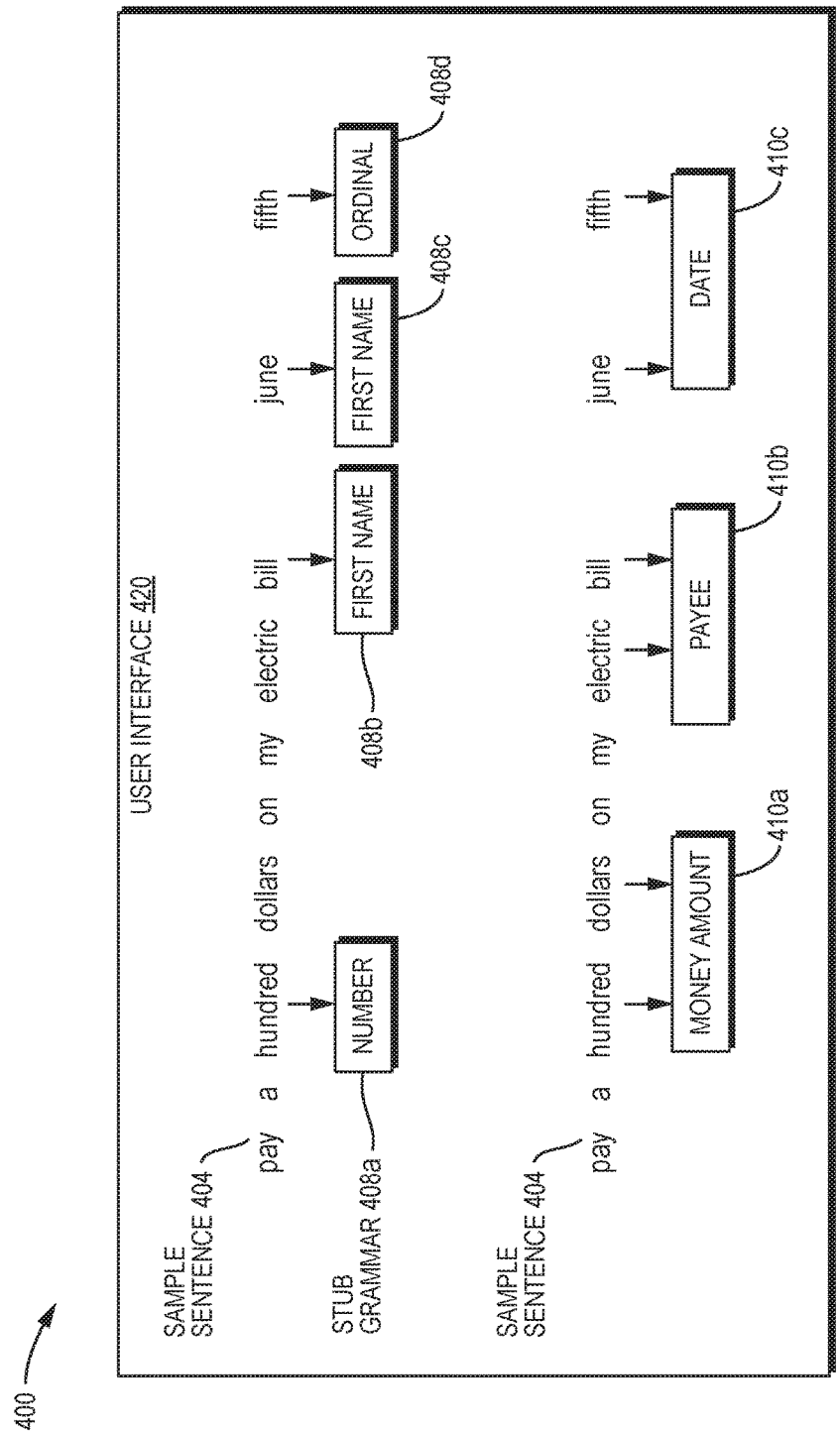
FIG. 4 is a screen view diagram illustrating an example embodiment of a user interface employed by the present invention.

FIG. 4 is a diagram 400 illustrating an example embodiment of a user interface 420 employed by the present invention. The user interface 420 can be displayed on a machine, such as a monitor, display, smart phone, tablet, mobile device, or other device. The user interface 420 displays a sample sentence 404 and corresponding stub grammars 408a-d and 410a-c. The sample sentence 404 states "pay a hundred dollars on my electric bill june fifth." The user interface 420 displays a first set of stub grammars 408a-408d corresponding with words in the sample sentence 404. For example, stub grammar 408a is "number" and corresponds with the word "hundred" of the sample sentence 404. Stub grammars 408b-c are both "FirstName" and correspond to the words "bill" and "june" of the sample sentence 404, respectively. Stub grammar 408d is "Ordinal" and corresponds with the word "fifth" of the sample sentence 408d.

The user interface shows the sample sentence 404 in relation to a second set of stub grammars 410a-c. The stub grammar 410a is "MoneyAmount" and corresponds with the words "hundred dollars" of the sample sentence 404. Stub grammar 410b is "payee" and corresponds with the words "electric bill" of the sample sentence 404. Stub grammar 410c is "Date" and corresponds with the words "june fifth" of the sample sentence 404.

The sample sentence 404, in this example embodiment, is "pay a hundred dollars on my electric bill june fifth". The user interface 420 further displays stub grammars 410a-f associated with the first parsed word 406a and second parsed word 406b. The stub grammars 410a-f can be shown as representations of the stub grammars 410a-f, such as names of the stub grammars 410a-f, fields of the stub grammars 410a-f, or other representation. The stub grammars 410a-f are shown in locations corresponding to a part of the sample sentence 404 with which the stub grammar 410a-f is associated.

A display or other device, via the user interface 420, presents the user with the choices of the stub grammars 408a-d and stub grammars 410a-c and their relations to the sample sentence 404. The user can select, for instance using a mouse, touch screen, or other selection device, a stub grammar to use to begin the NLU project, workspace, or model. As shown in FIG. 4, the user interface 420 shows stub grammars 408a-d and 410a-c, as well as the words of the sample sentence 404. For example, the user can select the first stub grammar 410a because it is a close match to the words of the sample sentence 404, where the stub grammar 408a may not be the type of stub grammar that the user intended to add to the project.

Figure 5:
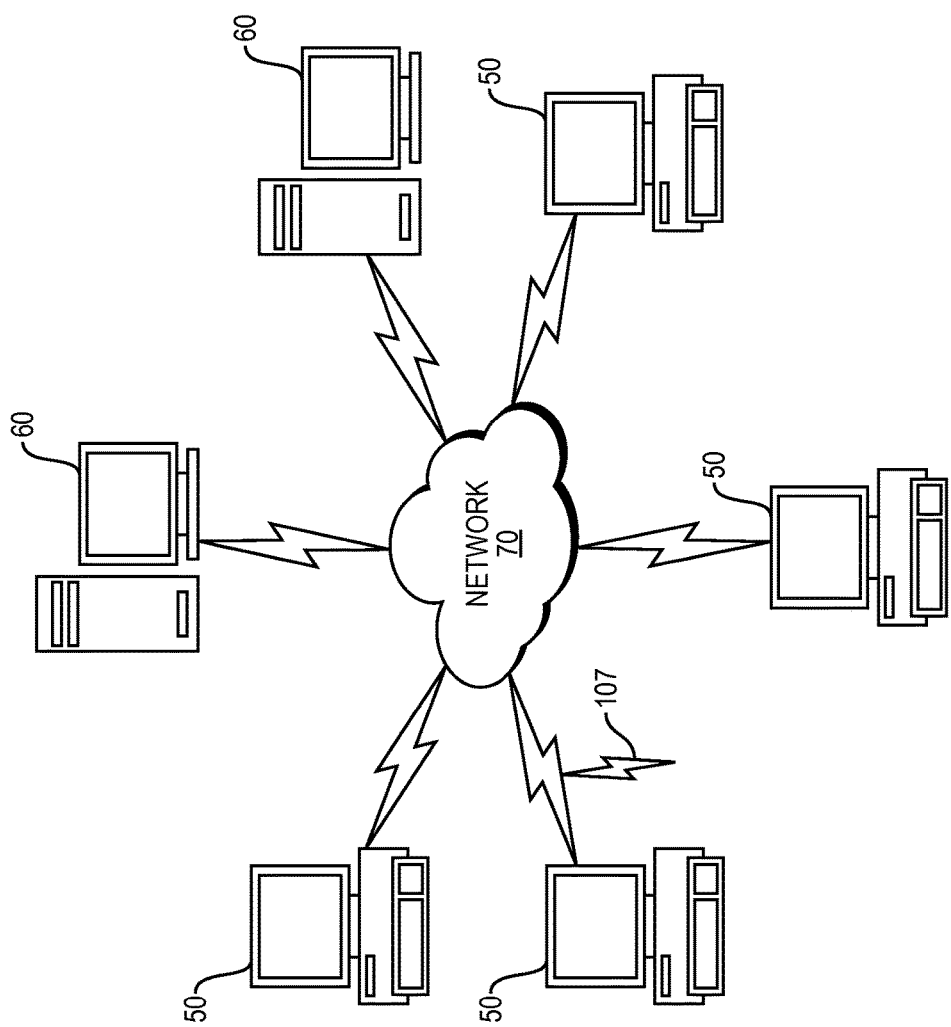
FIG. 5 is a network diagram illustrating a computer network or similar digital processing environment in which embodiments of the present invention may be implemented.

FIG. 5 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 6:
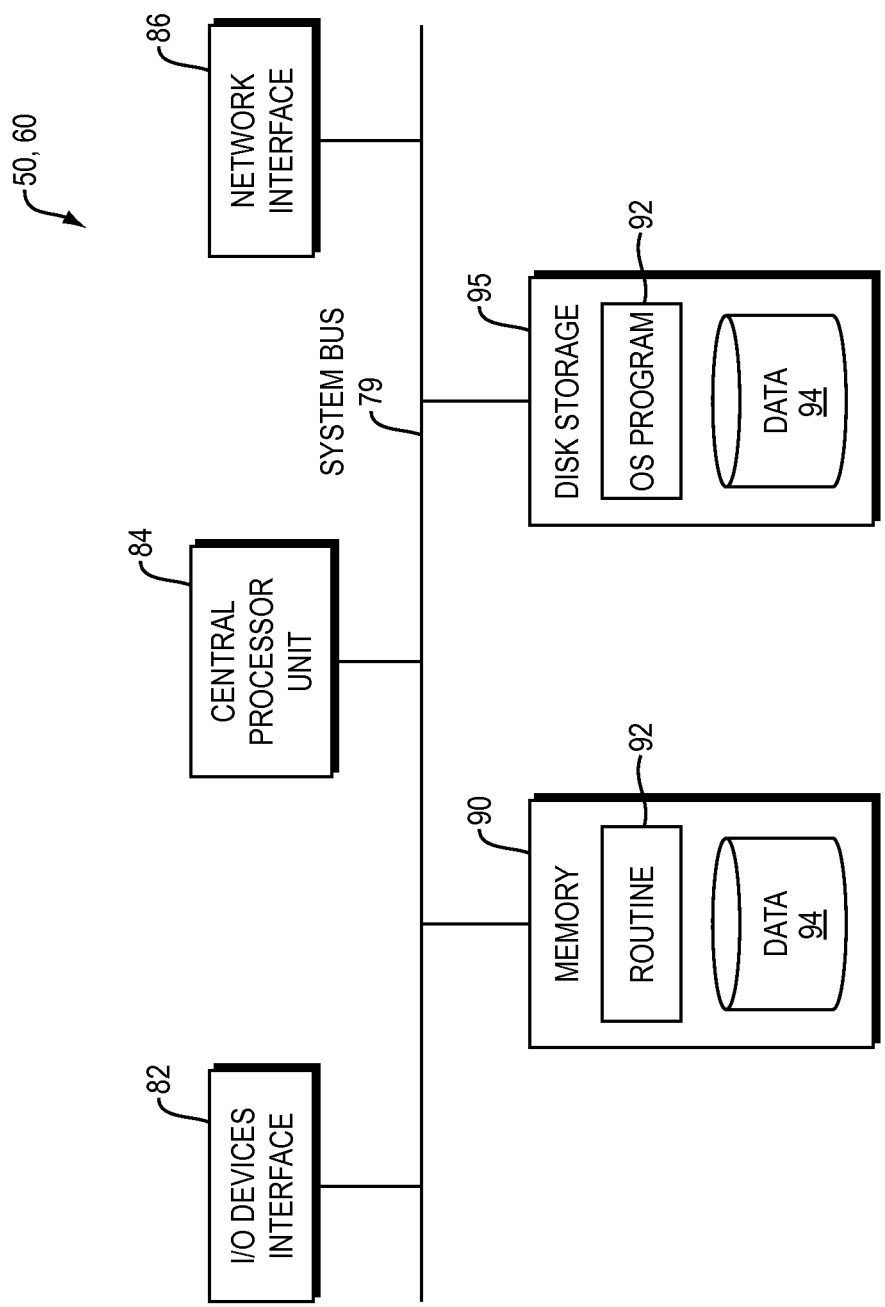
FIG. 6 is a diagram of an example internal structure of a computer (e.g., client processor/device or server computers) in the computer system of FIG. 5.

FIG. 6 is a diagram of an example internal structure of a computer (e.g., client processor/device 50 or server computers 60) in the computer system of FIG. 5. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 5). Memory 90 provides volatile storage for computer software instructions 92 and data 94 used to implement an embodiment of the present invention (e.g., structure generation module, computation module, and combination module code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer.

While this invention has been particularly shown and described with references to example embodiments thereof, it will be understood by those skilled in the art that various changes in form and details may be made therein without departing from the scope of the invention encompassed by the appended claims.

What is claimed is:

1. A method for initializing a workspace for building a Natural Language Understanding (NLU) system, the method comprising:

generating a plurality of prompt match scores of at least one candidate stub grammar associated with a sentence of a plurality of expected sentences by comparing a sample sentence to the plurality of expected sentences associated with the at least one candidate stub grammar, each prompt match score based on a semantic similarity of the sample sentence to each one of the plurality of expected sentences;

automatically selecting sets of at least one candidate stub grammar model from among a library of multiple candidate stub grammar models stored in a memory, the automatically selected sets of at least one candidate stub grammar model being associated with expected sentences having prompt match scores above a particular threshold, each candidate stub grammar model being a model correlating an input to a response, each candidate stub grammar further being created prior to the comparing of the sample sentence to the plurality of expected sentences, the model being associated with at least one concept associated with the sample sentence;

presenting, to a user, respective representations of the automatically selected sets of at least one candidate stub grammar model at a display;

enabling the user to choose one of the respective representations of the candidate stub grammar models presented on the display, the chosen one of the respective representations being associated with a chosen candidate stub grammar; and adding, using the processor, to the workspace the chosen stub grammar model corresponding to the representation of the candidate stub grammar model chosen by the user, the workspace being an ontology configured to store a plurality of stub grammar models, the workspace configured to build the NLU system.

2. The method of claim 1, wherein the respective representations are names of the candidate stub grammar models.

3. The method of claim 1, further comprising presenting each respective representation of the candidate stub grammar model to the user by visually presenting each of the respective representations of the candidate stub grammar model relative to a corresponding part of the sample sentence.

4. The method of claim 1, wherein the presented respective representations have a semantic match to the parsed sample sentence above a threshold.

5. The method of claim 1, wherein parsing the sample sentence further includes comparing the sample sentence to a stored sentence that is associated with at least one candidate stub grammar model, and if the sample sentence is semantically related to the stored sentence, selecting the at least one candidate stub grammar model associated with the stored sentence.

6. The method of claim 1, wherein parsing the sample sentence includes parsing the sample sentence to generate a set of annotations including mentions.

7. The method of claim 6, wherein the annotations further include mentions and intents.

8. A system for initializing a workspace for building a Natural Language Understanding (NLU) system, the system comprising:

a parsing module configured to:
generate a plurality of prompt match scores of at least one candidate stub grammar associated with a sentence of the plurality of expected sentences by comparing a sample sentence to the plurality of expected sentences associated with the at least one candidate stub grammar, each prompt match score based on a semantic similarity of the sample sentence to each one of the plurality of expected sentences, and automatically select sets of at least one candidate stub grammar model from among a library of multiple candidate stub grammar models stored in a memory, the automatically selected sets of at least one candidate stub grammar model being associated with expected sentences having prompt match scores above a particular threshold, each candidate stub grammar model being a model correlating an input to a response, each candidate stub grammar further being created prior to the comparing of the sample sentence to the plurality of expected sentences, the model being associated with at least one concept associated with the sample sentence;

a presentation module configured to present, at a display to a user, respective representations of the at least one automatically selected sets of candidate stub grammar model;

a user interface module configured to enable the user to choose one of the respective representations of the candidate stub grammar models presented on the display, the chosen one of the respective representations being associated with a chosen candidate stub grammar; and a workspace building module configured to add, using the processor, the chosen grammar model, chosen by the user from among the respective presented representations, to the workspace, the workspace being an ontology configured to store a plurality of stub grammar models, the workspace configured to build the NLU system.

9. The system of claim 8, wherein the respective representations are names of the candidate stub grammar models.

10. The system of claim 8, wherein the presentation module is further configured to visually present each of the respective representations of the candidate stub grammar models relative to a corresponding part of the sample sentence.

11. The system of claim 8, wherein the presented respective representations have a semantic match to the parsed sample sentence above a threshold.

12. The system of claim 8, wherein the parsing module is further configured to parse the sample sentence to generate a set of annotations including mentions.

13. The system of claim 12, wherein the annotations further include mentions and intents.

14. A non-transitory computer-readable medium configured to store instructions for initializing a workspace for building a Natural Language Understanding (NLU) system, the instructions, when loaded and executed by a processor, cause the processor to:

generate a plurality of prompt match scores of at least one candidate stub grammar associated with a sentence of the plurality of expected sentences by comparing a sample sentence to the plurality of expected sentences associated with the at least one candidate stub grammar, each prompt match score based on a semantic similarity of the sample sentence to each one of the plurality of expected sentences, and automatically select sets of at least one candidate stub grammar model from among a library of multiple candidate stub grammar models stored in a memory, the automatically selected sets of at least one candidate stub grammar model being associated with expected sentences having prompt match scores above a particular threshold, each candidate stub grammar model being a model correlating an input to a response, each candidate stub grammar further being created prior to the comparing of the sample sentence to the plurality of expected sentences, the model being associated with at least one concept associated with the sample sentence;

present, on a display to a user, respective representations of the automatically selected sets of at least one candidate stub grammar model;

enable the user to choose one of the respective representations of the candidate stub grammar models presented on the display, the chosen one of the respective representations being associated with a chosen candidate stub grammar; and add, using the processor, to the workspace the chosen stub grammar model corresponding to the representation of the candidate stub grammar model chosen by the user, the workspace being an ontology configured to store a plurality of stub grammar models, the workspace configured to build the NLU system.

15. The non-transitory computer-readable medium of claim 14, wherein the respective representations are names of the candidate stub grammar models.

16. The non-transitory computer-readable medium of claim 14, wherein the instructions further cause the processor to present each respective representation of the candidate stub grammar models to the user by visually presenting each of the respective representations of the candidate stub grammar models relative to a corresponding part of the sample sentence.

17. The non-transitory computer-readable medium of claim 14, wherein the presented respective representations have a semantic match to the parsed sample sentence above a threshold.

18. The non-transitory computer-readable medium of claim 14, wherein instructions further cause the processor to parse the sample sentence to generate a set of annotations including mentions.

19. The non-transitory computer-readable medium of claim 18, wherein the annotations further include mentions and intents.

* * * * *